United States Patent [19]

Higgins

[11] 4,418,615

[45] Dec. 6, 1983

[54] CONVECTION BARBECUE PIT

[76] Inventor: Michael R. Higgins, P.O. Box 522, Mesquite, Tex. 75149

[21] Appl. No.: 391,676

[22] Filed: Jun. 24, 1982

[51] Int. Cl.³ .......................................... A47J 27/62
[52] U.S. Cl. ..................................... 99/331; 99/352; 99/446; 99/447; 99/448; 99/480; 126/21 A
[58] Field of Search ................ 99/331, 352, 446, 447, 99/448, 474, 475, 476, 480; 126/59.5, 21 A

[56] References Cited

U.S. PATENT DOCUMENTS

| | | | |
|---|---|---|---|
| 2,074,945 | 3/1937 | Skvor | 99/476 |
| 3,199,436 | 8/1965 | Rasmussen | 99/474 X |
| 3,223,022 | 12/1965 | Powell | 99/476 X |
| 3,316,831 | 5/1967 | Koland | 99/352 |
| 3,524,403 | 8/1970 | Treloar | 99/331 |
| 3,721,177 | 3/1973 | Booker | 99/331 |
| 3,747,513 | 7/1973 | Seelbach | 99/480 X |
| 3,789,824 | 2/1974 | Mason | 99/480 X |
| 3,882,767 | 5/1975 | Oyler | 99/339 |
| 3,903,788 | 9/1975 | Freeland | 99/475 |
| 3,961,571 | 6/1976 | Decuir | 99/474 |
| 4,076,008 | 2/1978 | Deaton | 99/447 X |
| 4,300,523 | 11/1981 | Robertson | 99/474 X |

Primary Examiner—Billy J. Wilhite
Attorney, Agent, or Firm—Gunn, Lee & Jackson

[57] ABSTRACT

An energy efficient convection barbecue pit for uniform cooking of meat. Heated smoke from a firebox passes through a joinder flue into a cooking chamber and is there urged upward by means of an inlet baffle. A convection fan located within a discharge duct connected to the ceiling of the cooking chamber draws the entering smoke through a suction port and discharges it through the duct. The discharge duct channels the smoke toward the front of cooking chamber and then downward thereby creating a turbulent, rolling air flow motion and a uniform temperature profile within the cooking chamber. Exhaust smoke exits at the bottom of the cooking chamber on either side of the inlet baffle and collects in a plenum chamber before exiting through an exhaust stack. Temperature within the cooking chamber is monitored by a thermostatically controlled firebox damper on the firebox door and a thermostatically controlled gas burner adjacent to the firebox. The gas burner functions both as a fire starter and as a temperature floor. A bypass damper in the plenum chamber directs smoke from the firebox into the cooking chamber when the barbecue pit is in the cooking mode and permits direct passage of smoke from the firebox through the exhaust stack when the barbecue pit is in the evacuation mode.

16 Claims, 9 Drawing Figures

CONVECTION BARBECUE PIT

BACKGROUND OF THE INVENTION

The cooking of meat by the application of heated smoke from a wood burning fire has been practiced for many years. This procedure is known to give the resulting meat product a highly desirable flavor. Nevertheless, the achievement of uniformly cooked meat and the efficient use of fuel and energy are continual problems associated with such a procedure. A variety of methods and designs aimed at solving these problems are seen in the prior art discussed hereinbelow.

The present invention achieves energy efficient, uniform cooking of meat while maintaining the desirable effect of a wood burning fire. Heated smoke from a wood burning firebox passes through a joinder flue into a cooking chamber wherein it is urged upward by means of an inlet baffle. A convection fan located within a discharge duct connected to the ceiling of the cooking chamber draws the entering smoke through a suction port and blasts it through the duct. The discharge duct channels the smoke toward the front of the cooking chamber and then downward, thereby creating a turbulent, rolling air flow motion and a uniform temperature profile within the cooking chamber. The cooler exhaust smoke is drawn outward at the bottom rear of the cooking chamber through outlet ducts located on either side of the inlet baffle. The exhaust smoke collects in a plenum chamber and is urged outward through an exhaust stack. A bypass damper in the plenum chamber directs smoke from the firebox into the cooking chamber when the barbecue pit is in the cooking mode. The bypass damper also permits direct passage of smoke from the firebox into the plenum chamber and out through the exhaust stack when the barbecue pit is in the evacuation mode. Temperature within the cooking chamber is monitored by a thermostatically controlled firebox damper er on the firebox access door and a thermostatically controlled gas burner adjacent to the firebox. The gas burner functions both as a fire starter and as a temperature floor. The result is an energy efficient, wood burning barbecue pit in which meat may be uniformly cooked.

BRIEF DESCRIPTION OF THE PRIOR ART

Numerous apparatus for cooking meat by the application of heated smoke are present in the prior art. U.S. Pat. No. 3,524,403 issued to Treloar discloses a gas fired, wood burning barbecue oven which uses a damper and hood mounted blower means to regulate the amount of air entering the cooking chamber and the corresponding combustion rate. Smoke from the combustion chamber passes directly into the cooking chamber and out through a flue. Temperature within the cooking area is regulated by a gas valve and water valve.

In U.S. Pat. No. 3,961,571, issued to Decuir, temperature is regulated by a thermostatically controlled gas burner and a thermostatically controlled damper positioned within a smoke exhaust duct. Decuir suggests the use of an exhaust blower to clear the oven of smoke prior to opening the hood as well as the use of a small fan to blow air over an electrical heating unit into the oven. U.S. Pat. No. 3,882,767, issued to Oyler, and the prior Oyler patents cited therein, diclose the use of a thermostatically controlled firebox damper for maintaining a predetermined cooking temperature.

Neither Treloar, Decuir nor Oyler suggest the use of a centrally mounted convection fan in combination with a thermostatically controlled firebox damper and thermostatically controlled gas burner for the creation of an energy efficient cooking system. Likewise, none of the patents suggest the creation of a turbulent, rolling air flow motion and uniform temperature profile by the use of a centrally mounted convection fan located within a discharge duct connected to the ceiling of the cooking chamber. Furthermore, none of the above patents disclose a plenum chamber having a dual function bypass damper therein capable of alternatively directing smoke from the firebox into the cooking chamber or permitting direct exhaust of both firebox smoke and smoke from the cooking chamber.

The use of a fan for circulation of heated smoke is disclosed in U.S. Pat. No. 3,721,177, issued to Booker. A fan is used to discharge smoke downwardly through ducts on each side of the cooking room and draw the smoke upwardly through the meat for recirculation. U.S. Pat. No. 3,903,788 issued to Freeland, et al., also discloses a blower mechanism for discharging smoke laden air downward through elongated ducts and downwardly directed nozzles. The smoke is then urged upward and inward through racks of meat by the use of vertical baffles. U.S. Pat. No. 3,223,022, issued to Powell, discloses a rear mounted fan unit for circulating smoke within a cooking chamber. Once again, neither Booker, Freeland, or Powell disclose the use of a centrally mounted convection fan in combination with a thermostatically controlled firebox damper and thermostatically controlled gas burner for the creation of an energy efficient cooking system. Furthermore, none of these patents disclose a plenum chamber having a dual function bypass damper therein capable of directing smoke from the firebox into the cooking chamber or permitting direct exhaust of firebox smoke with smoke from the cooking chamber.

The above cited patents are typical of those found in the prior art. For example, U.S. Pat. No. 3,199,436 issued to H. J. Rasmussen, et al., and U.S. Pat. No. 2,074,945 issued To Skvor disclose the use of a fan. U.S. Pat. No. 3,316,831 issued to D. H. Koland, et al., and U.S. Pat. No. 4,076,008 issued to Deaton disclose the use of a gas burner as a fire starter. U.S. Pat. No. 3,789,824 issued to Mason discloses the use of a damper capable of permitting the passage of smoke from a first cooking chamber to a second cooking chamber or directing the smoke from the first cooking chamber through the exit flue. Nevertheless, these patents do not teach the unique combination called for by the present invention.

SUMMARY OF THE INVENTION

It is a primary object of the present invention to provide an energy efficient, wood burning barbecue pit that decreases the time and/or temperature required to cook barbecued meat. Smoke from a wood burning firebox passes through a joinder flue to a cooking chamber and is therein urged upward within the chamber by means of an inlet baffle. The hot smoke is forced downward around the meat products in a turbulent, rolling air flow motion by means of a high velocity convection air system and is withdrawn from the bottom of the cooking chamber through exit ducts located on either side of the inlet baffle. A thermostatically controlled firebox damper on the firebox access door regulates the passage of air into the firebox and thereby controls the firebox combustion rate and corresponding cooking chamber temperature. A thermostatically controlled gas burner adjacent to the firebox functions as a fire starter and as a temperature floor within the cooking chamber. During operation of the barbecue pit the temperature within the cooking chamber remains between the temperature ceiling set by the firebox damper thermostat and the temperature floor set by the gas burner thermostat. The combination of the convection air system together with the temperature control system lowers cooking times and/or temperature requirements and reduces fuel consumption.

Another object of the present invention is to provide a wood burning barbecue pit wherein a uniform temperature profile is created and maintained within the cooking chamber. A convection fan located within a discharge duct attached to the ceiling of the cooking area draws entering smoke upward through a suction port and discharges it through the duct. The discharge duct channels the smoke toward the front of the cooking chamber and then downward through a discharge vent in a line parallel to the front of the cooking chamber, thereby creating a turbulent, rolling air flow motion within the chamber. This air flow motion creates a uniform temperature profile within the cooking chamber and allows the meat to be uniformly cooked.

Still another object of the present invention is to provide a wood burning barbecue pit wherein a gas burner functions both as a fire starter and as a temperature floor. A thermostatically controlled gas burner assembly adjacent to the firebox shoots a forced air flame through an open blast gate at an angle away from the firebox door and into the material to be ignited. When the temperature within the cooking chamber reaches the temperature floor as set by the gas burner thermostat, the blast gate closes and the gas burner is deenergized. If the temperature within the cooking chamber ever falls below the preset temperature floor during operation of the barbecue pit, the blast gate will reopen and the gas burner will again be reenergized so as to maintain a lower temperature level within the cooking chamber.

A further object of the present invention is to provide a wood burning barbecue pit wherein smoke may be exhausted directly from the firebox and wherein smoke from the cooking chamber and firebox may be exhausted simultaneously. The joinder flue between the cooking chamber and the firebox and the outlet flues from the cooking chamber are all connected to a plenum chamber at the rear of the barbecue pit. A switch controlled bypass damper located within the plenum chamber determines whether smoke from the firebox will pass into the cooking chamber or directly into the plenum chamber to be exhaused through the exhaust stack. When the control switch is in the evacuation mode, the bypass damper will be open and smoke will be exhausted from the cooking chamber and the firebox simultaneously. When the control switch is in the cooking mode, the bypass damper will be closed and smoke from the firebox will be directed into the cooking chamber.

A still further object of the present invention is to provide a wood burning barbecue pit having a nuisance smoke evacuation system for the entrapment of nuisance smoke that may be admitted near the firebox. The firebox access door is provided with a horizontal slit whereby nuisance smoke immediately adjacent to the firebox may be drawn into a conduit located between the firebox and the cooking chamber. A channel flue connected to the conduit and a cooking chamber outlet flue allows the nuisance smoke to be passed from the conduit into the plenum chamber and out through the exhaust stack.

Further objects will be apparent as the convection barbecue pit is described in greater detail hereinbelow.

DESCRIPTION OF THE PREFERRED EMBODIMENT

Figure 1:
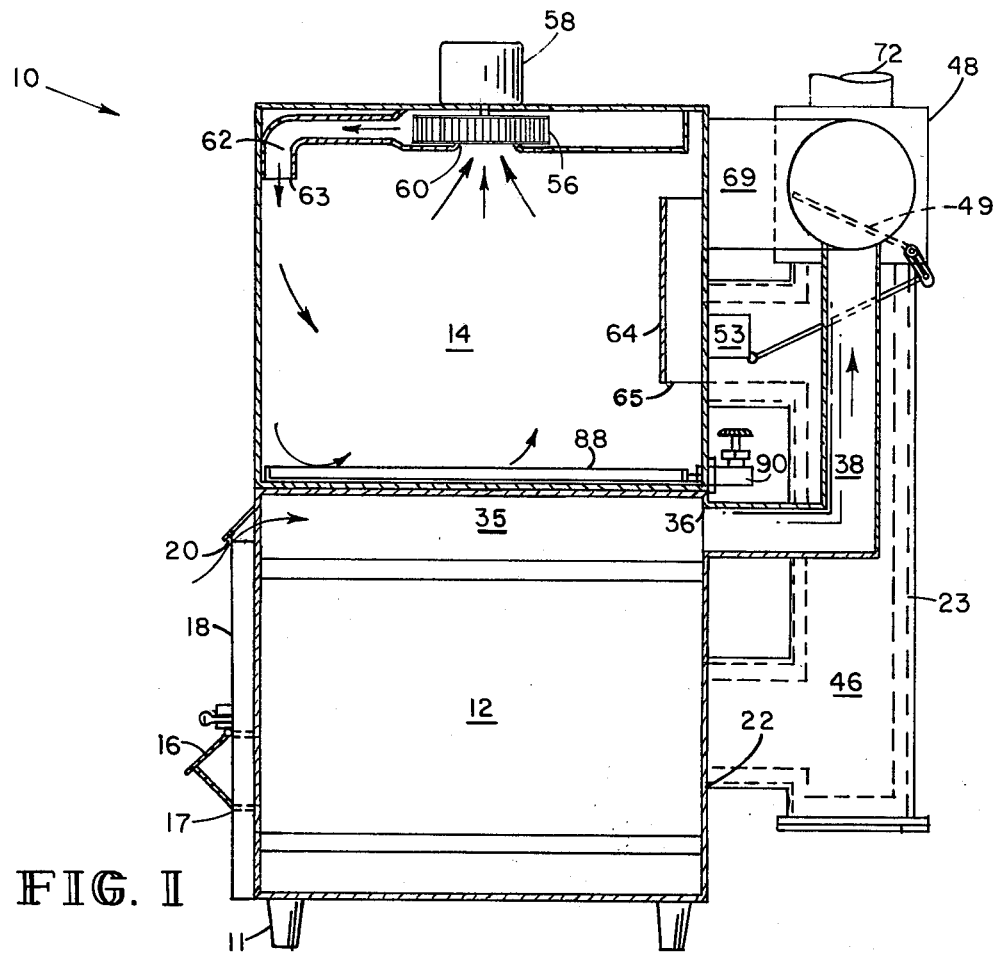
FIG. 1 is a cross-sectional side view of the convection barbecue pit showing the firebox, cooking chamber, joinder flue, and convection air system.
Figure 2:
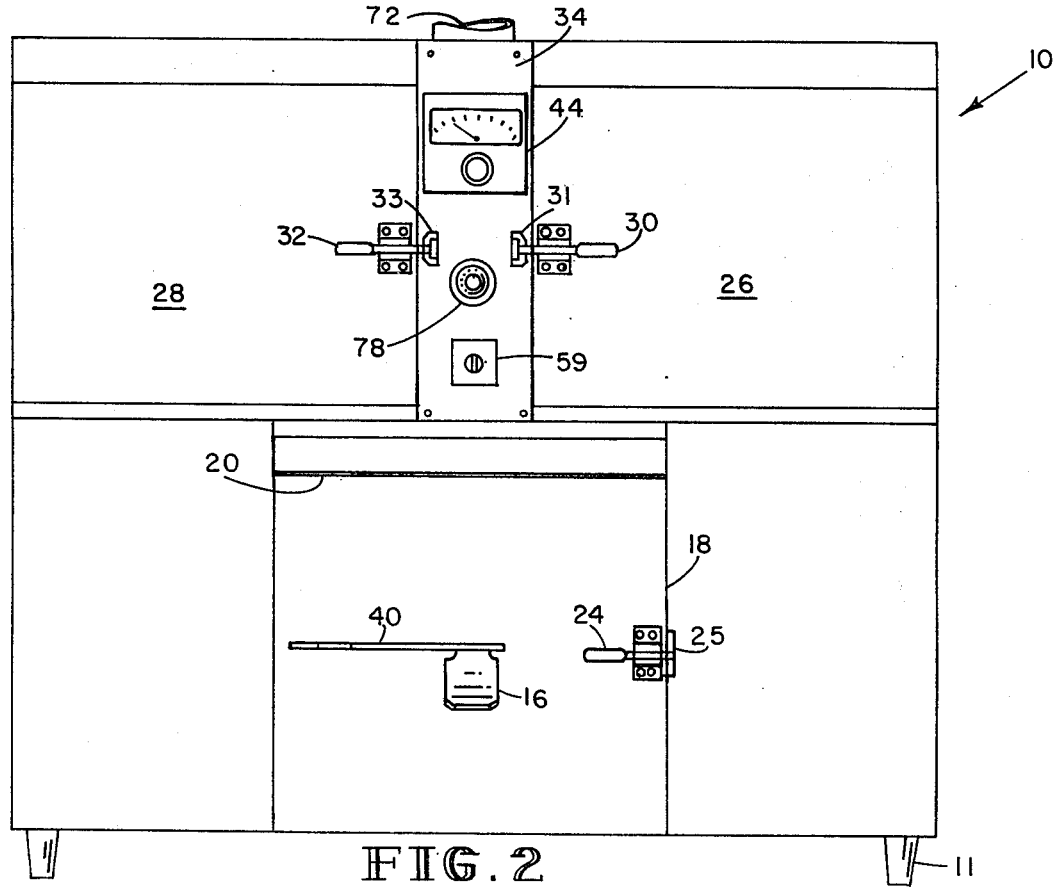
FIG. 2 is a front view of the convection barbecue pit showing the firebox access door and a pair of cooking chamber access doors.
Figure 9:
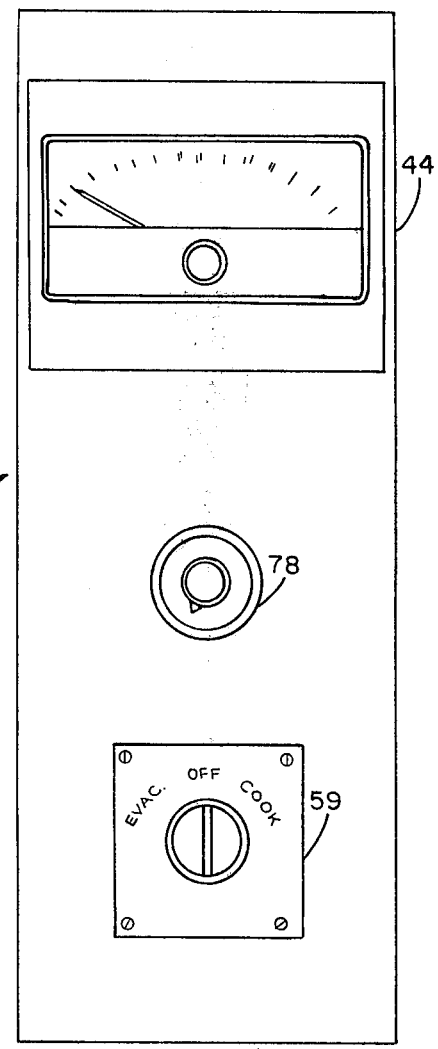
FIG. 9 is a plan view of the convection barbecue pit control panel.

Referring to FIG. 1, the convection barbecue pit 10 is supported by a plurality of legs 11 and comprises a combustion chamber or firebox 12 located beneath a cooking chamber 14. As shown in FIG. 2, access to the firebox 12 is achieved by means of a firebox door 18 appropriately equipped with a handle 24 and corresponding catch 25. Access to cooking chamber 14 is achieved by a pair of oven doors 26 and 28. Handles 30, 32 and catches 31, 33 are provided for cooking chamber doors 26 and 28, respectively. A control panel 34, consisting of a three position control switch 59, a gas burner thermostat 78 and a firebox thermostat 44, is mounted to the front of the barbecue pit 10 between oven doors 26 and 28. Control panel 34 is shown in more detail in FIG. 9.

Figure 6:
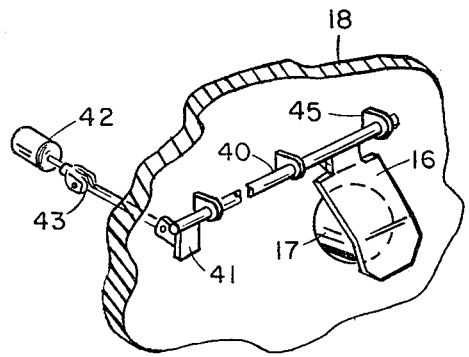
FIG. 6 is a perspective view of the combustion air damper assembly.

As more clearly illustrated in FIG. 6, firebox access door 18 includes a firebox damper 16 for controlling the passage of air into firebox 12 through firebox inlet port 17. Firebox damper 16 is connected to damper rod 40 and damper rod 40 is supported by brackets 45 which extend outward from firebox access door 18. Firebox damper servo motor 42 rotates damper rod 40 by means of an appropriate linkage 43 connected at one end to damper rod connection plate 41 and at the other end to servo motor 42. Firebox damper servo motor 42 is controlled by means of firebox thermostat 44 and temperature sensing probes 79 located in the center of cooking chamber 14. In this manner, firebox thermostat 44 will indirectly control the temperature within cooking chamber 14 by regulating the passage of air through firebox inlet port 17 and the corresponding combustion rate within firebox 12.

Firebox outlet port 22 at the rear of firebox 12 permits the passage of hot smoke from firebox 12 into joinder flue 46. Joinder flue 46 is connected to plenum chamber 48 at joinder flue port 50 and cooking chamber 14 at cooking chamber inlet port 52. The firebox 12 and joinder flue 46 are preferably lined with a cast refractory material 23 for purposes of safety and insulation.

Figure 7:
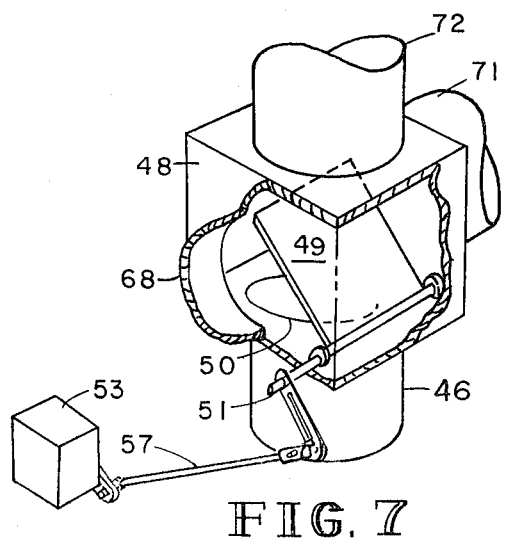
FIG. 7 is a perspective view of the plenum chamber and bypass damper assembly.

As more clearly illustrated in FIG. 7, the directional flow of smoke through joinder flue 46 is controlled by means of a bypass damper 49 located within the plenum chamber 48 adjacent to joinder flue port 50. Bypass damper 49 is connected to bypass damper rod 51 which in turn is connected to bypass damper servo motor 53 by an appropriate linkage arm 57. Activation of servo motor 53 is controlled by control switch 59 on control panel 34. When control switch 59 is in the EVACUATION position, bypass damper 49 will be open and smoke will pass directly from joinder flue 46 into plenum chamber 48 through joinder flue port 50. When control switch 59 is in the COOK position, bypass damper 49 will cover joinder flue port 50 and direct the smoke from joinder flue 46 into cooking chamber 14 through cooking chamber inlet port 52.

Inlet baffle 54 is connected to the rear wall of cooking chamber 14 adjacent to cooking chamber inlet port 52 and is sealed along it's lower edge and sides. A convection fan 56 is located within a discharge duct 62 mounted to the ceiling of cooking chamber 14. Smoke entering cooking chamber 14 through cooking chamber inlet port 52 is urged upward by inlet baffle 54 and drawn into discharge duct 62 through suction port 60 by centrally mounted convection fan 56. Convection fan 56 is operated by convection fan motor 58 mounted to the top of the barbecue pit 10. As illustrated by the arrows in FIG. 1, the convection fan 56 forces the smoke through discharge duct 62 toward the front of the cooking chamber 14 and then downward through discharge vent 63 in a line parallel to access doors 26 and 28 of cooking chamber 14. Discharge vent 63 may also be provided with an adjustable sliding louver (not shown) in order to further control the flow of smoke within cooking chamber 14. In this manner, the meat within cooking chamber 14 will be uniformly exposed to the heated smoke from firebox 12.

Figure 3:
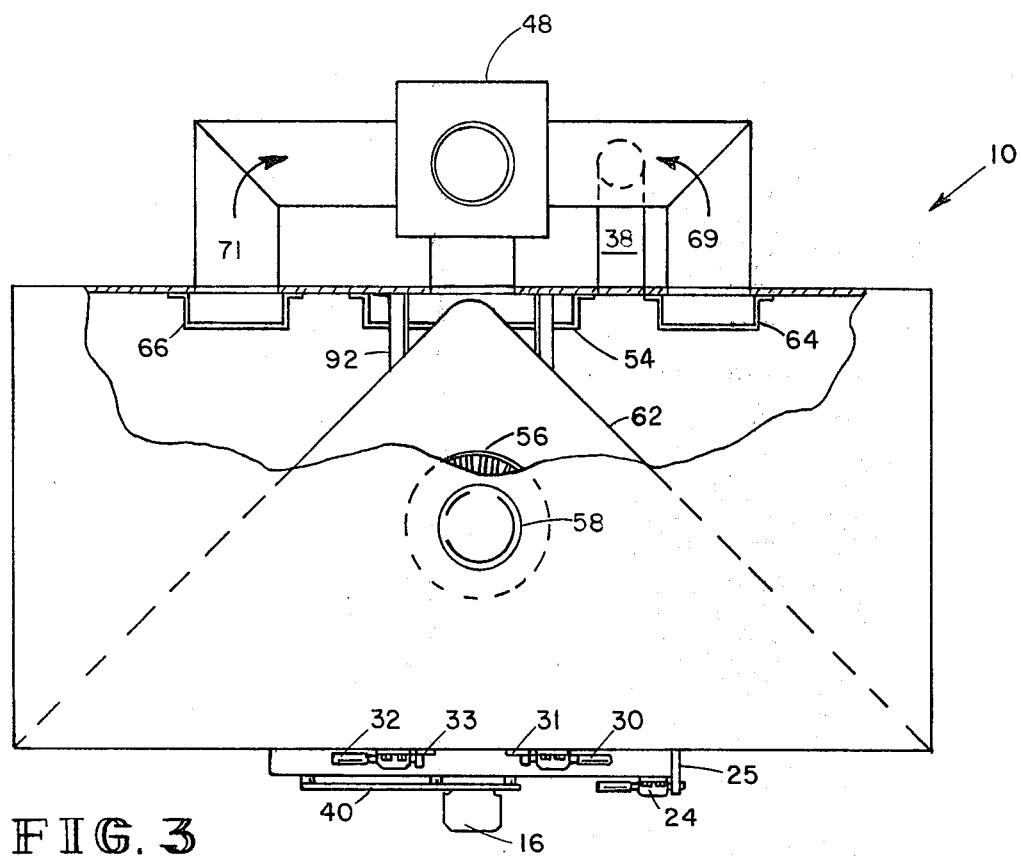
FIG. 3 is a top view of the convection barbecue pit showing the cooking chamber outlet flues.

Outlet ducts 64 and 66 are attached to the rear wall of cooking chamber 14 on opposite sides of inlet baffle 54 and are sealed along their upper edges and sides. Smoke at the bottom of cooking chamber 14 is drawn into exit ducts 64 and 66 through exit duct openings 65 and 67, respectively. As illustrated by the arrows in FIG. 3, smoke within cooking chamber outlet ducts 64 and 66 passes through cooking chamber outlet ports 68 and 70 into cooking chamber outlet flues 69 and 71, respectively. Exhaust smoke from cooking chamber outlet flues 69 and 71 collects in plenum chamber 48 and is urged outward through the exhaust stack. Stack fan 74 is controlled by stack fan motor 73 and is activated whenever control switch 59 is in the EVACUATION position. Smoke from the exhaust stack 72 passes through the roof or into an appropriate exhaust hood (not shown).

As shown by the arrows in FIG. 1, horizontal passage slit 20 on firebox access door 18 permits nuisance smoke in the vicinity of firebox access door 18 to be drawn into conduit 35 located between firebox 12 and cooking chamber 14. The smoke may then be drawn through conduit port 36 into channel flue 38 which is shown connected to cooking chamber outlet flue 69. In this manner, nuisance smoke near firebox access door 18 may be removed and exhausted through exhaust stack 72 together with the exhaust smoke from cooking chamber 14.

Figure 4:
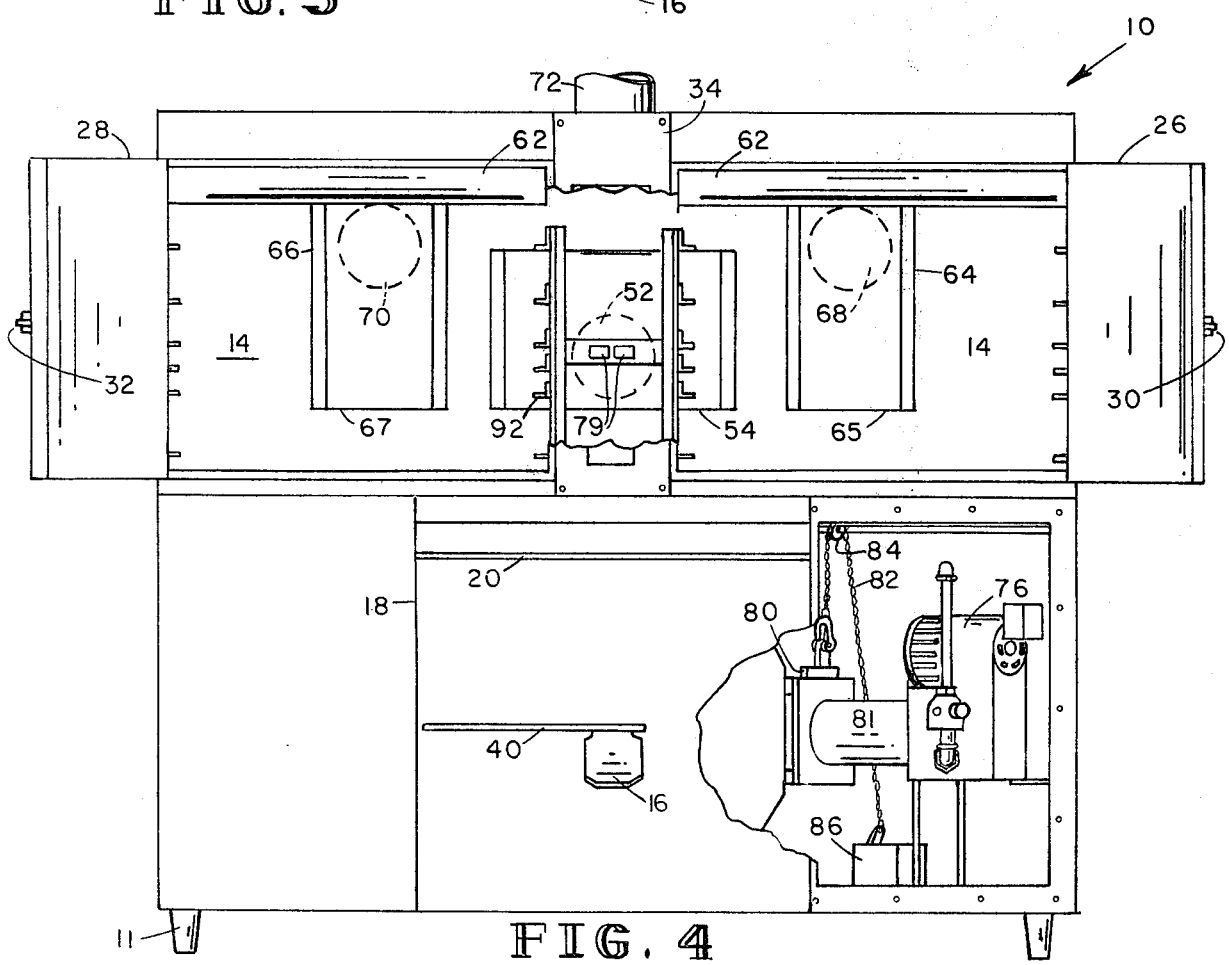
FIG. 4 is a front view of the convection barbecue pit showing the gas burner assembly and cooking chamber interior.
Figure 5:
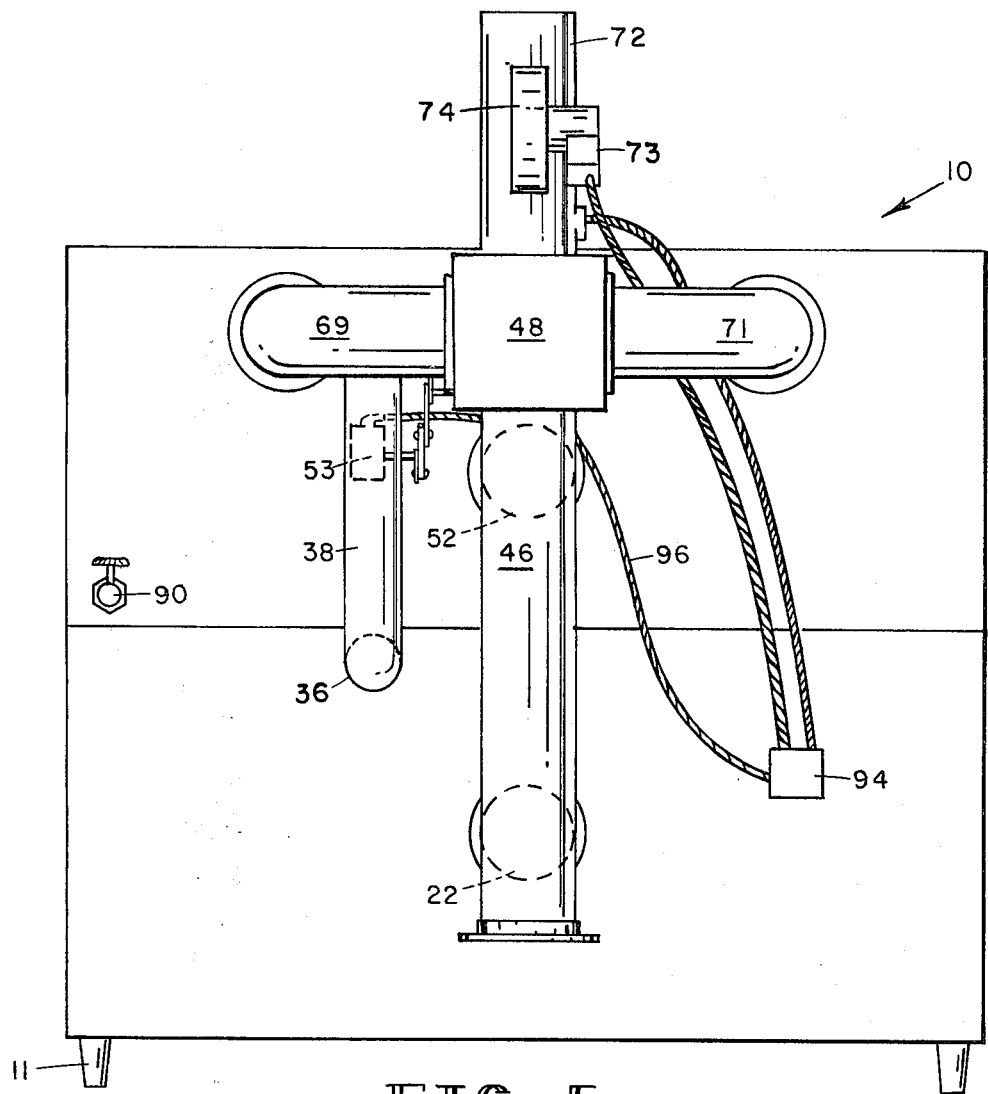
FIG. 5 is a rear view of the convection barbecue pit showing the plenum chamber, joinder flue, cooking chamber outlet flues, exhaust stack, and nuisance smoke channel flue.
Figure 8:
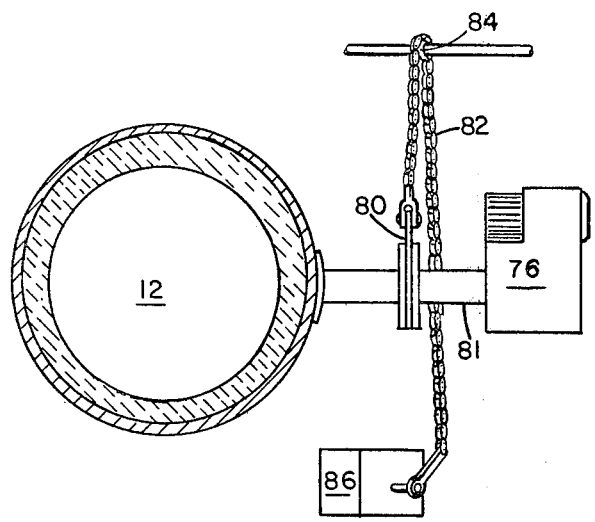
FIG. 8 is a plan view of the gas burner blast gate assembly.

As illustrated in FIG. 4 and FIG. 8, the convection barbecue pit 10 is equipped with a gas burner 76. Gas burner 76 is capable of providing a forced air flame through flame duct 81 into firebox 12. Blast gate 80 protects the elements of gas burner 76 from the radiant heat within fire box 12 when gas burner 76 is not activated. As illustrated in FIG. 4, flame duct 81 is angled away from firebox access door 18. Because firebox damper 16 closes when gas burner 76 is activated, this design protects the barbecue pit operator from the forced air flame.

Blast gate 80 is connected to blast gate servo motor 86 by means of a linkage chain and arm 82 which is engaged around sprocket 84. Blast gate servo motor 86 is controlled by gas burner thermostat 78 and temperature sensing probes 79 located in the center of cooking chamber 14. Blast gate 80 is raised whenever the temperature within cooking chamber 14 is below the temperature indicated by gas thermostat 78. Blast gate servo motor 86 lowers the blast gate 80 whenever the temperature within the cooking chamber 14 is above the preset temperature indicated by gas thermostat 78.

As an additional feature of convenience, the cooking chamber 14 is provided with a grease pan 88 and grease pan drain valve 90. Grease pan 88 collects grease from the meat during cooking and may be drained periodically out the rear of the unit 10 through grease pan drain valve 90.

The cooking chamber 14 is also provided with a plurality of meat rack guides 92 attached to the walls of cooking chamber 14 for supporting a plurality of meat racks (not shown). The meat racks support the meat to be cooked and may be removed for periodic cleaning.

Electrical conduits 96 connect bypass damper servo motor 53, exhaust fan servo motor 73 and convection fan motor 58 to external power box 94. It is to be understood that the barbecue pit 10 is also equipped with an electrical junction box (not shown) inside the unit.

Although the invention barbecue pit is a high capacity unit, it is relatively compact. In the preferred embodiment, the cooking chamber 14 has a height of $25\frac{1}{4}$ inches, a width of 68 inches and a depth of 32 inches. The plenum chamber 48 has a height of 13 inches and a width of 12 inches. The joinder flue has a diameter of 9 inches while cooking chamber outlet flues 69 and 71 have a diameter of 8 inches. These dimensions have been found to be preferable and advantageous over other dimensions.

METHOD OF OPERATION

Before beginning actual operation of the barbecue pit, the meat desired to be cooked must be placed upon the removable meat shelves (not shown) that are supported by meat rack guides 92 attached within the cooking chamber 14. Likewise, wood logs or charcoal (not shown) must be placed within the firebox 12. At this time control switch 59 will be in the OFF position and all servo motors and fans will be dormant. Firebox thermostat 44 and gas thermostat 78 are then set by the barbecue pit operator. Firebox thermostat 44 is set for the desired cooking temperature while gas thermostat 78 is set for the lower limit temperature control point.

When control switch 59 is adjusted to the COOK position, several events occur. Convection fan 56 is activated and gas thermostat 78 energizes blast gate servo motor 86 and gas burner 76. Blast gas servo motor 86 opens blast gate 80 and gas burner 76 blasts a flame through flame duct 81 at a slight angle toward the rear of firebox 12. When gas thermostat 78 energizes gas burner 76, firebox damper 16 is closed in order to protect the barbecue pit operator from flame back through firebox inlet port 17. Blast gate 80 remains open and gas burner 76 remains energized as long as the temperature within cooking chamber 14 is below the lower limit as indicated by gas thermostat 78. When control switch 59 is in the COOK position bypass damper 49 will be closed and smoke from firebox 12 will be directed into cooking chamber 14.

Once the temperature within cooking chamber 14 reaches the temperature floor indicated by gas thermostat 78, blast gate servo motor 86 will close blast gate 80 and gas burner 76 will be deactivated. At the same time, firebox damper 16 will open to a sufficient degree to allow the temperature within the cooking area to reach the preset level indicated by firebox thermostat 44. By controlling the passage of air into firebox 12 and the corresponding combustion rate, firebox damper 16 will indirectly control the temperature within cooking chamber 14. Should the temperature within cooking chamber 14 ever fall below the temperature floor set by gas thermostat 78, the gas burner system will again take priority over the firebox system.

Once the wood logs or charcoal (not shown) are lit, smoke from firebox 12 passes through firebox outlet port 22, joinder flue 46 and cooking chamber inlet port 52. Inlet baffle 54 urges the smoke to the top of cooking chamber 14 where it is drawn through suction port 60 by convection fan 56. Convection fan 56 then discharges the smoke through discharge duct 62 toward the front of the cooking chamber 14 and then downward through duct vent 63. This creates a turbulent, rolling air flow motion within cooking chamber 14 and a uniform temperature profile around the meat located on the meat racks (not shown). This procedure also directs the hot smoke from firebox 12 as far away as possible from the hot grease in grease pan 88.

Once the cooler smoke reaches the bottom of cooking chamber 14, it is drawn out through outlet ducts 64 and 66 located on either side of inlet baffle 54. The smoke passes through outlet ports 68, 70 and outlet flues 69, 71 and collects in plenum chamber 48. The collected smoke is then urged upward and out of the system through exhaust stack 72.

Throughout the operation of the barbecue pit, nuisance smoke in the immediate vicinity of firebox access door 18 will be drawn through horizontal slit 20 in firebox door 18 and into the plenum chamber 48 through conduit 35 and channel flue 38. The nuisance smoke will mix with the cooking chamber exhaust smoke in plenum chamber 48 and be passed out of the system in a similar fashion.

When control switch 59 is adjusted to the EVACUATION position, several events occur. Firebox damper 16 closes and bypass damper 49 opens to allow smoke and heat from firebox 12 to vent directly through plenum chamber 48 and exhaust stack 72. Convection fan motor 58 is deactivated and stack fan 74 is energized in order to induce a stronger stack flow for evacuating the smoke from cooking chamber 14 and firebox 12. Finally, gas burner 76 and blast gate servo motor 86 are both deactivated when the barbecue pit 10 is in the EVACUATION mode.

Once smoke has been evacuated from cooking chamber 14 and firebox 12, control switch 59 may be returned to the OFF position and the barbecue pit 10 may be prepared for a new cooking cycle.

While the convection barbecue pit has been described in connection with the preferred embodiment, it is not intended to limit the invention to the particular forms set forth, but on the contrary, it is intended to cover such alternatives, modifications, and equivalents as may be included within the spirit and scope of the invention as defined by the appended claims.

I claim:

1. A thermostatically controlled convection barbecue pit, comprising:

a firebox comprising a firebox access door, a firebox outlet port, and a firebox inlet port;

thermostatically controlled firebox damper means for regulating the passage of air through said firebox inlet port into said firebox;

a cooking chamber having at least one cooking chamber access door, said cooking chamber having an inlet port and a first and second cooking chamber outlet port on opposite sides of said cooking chamber inlet port;

a joinder flue connected at a lower end to said firebox and at an intermediate end to said cooking chamber for the passage of smoke from said firebox through said firebox outlet port into said cooking chamber through said cooking chamber inlet port;

a plenum chamber connected to said joinder flue at an upper end of said joinder flue, said plenum chamber having a dual function bypass damper means therein capable of alternatively directing smoke from said firebox into said cooking chamber or permitting direct exhaust of smoke from said firebox;

a baffle secured within said cooking chamber adjacent to said cooking chamber inlet port for urging smoke from said joinder flue upward within said cooking chamber;

a discharge duct mounted to the ceiling of said cooking chamber comprising a suction port, a discharge vent, and a convection fan mounted within said discharge duct above said suction port, said discharge duct shaped to urge smoke forward within said discharge duct in a line parallel to the ceiling of said cooking chamber and then downward through said discharge vent in a line parallel to said cooking chamber access door;

a first outlet duct secured within said cooking chamber adjacent to said first cooking chamber outlet port and a second outlet duct secured within said cooking chamber adjacent to said second cooking chamber outlet port for withdrawing smoke from the bottom of said cooking chamber on either side of said baffle;

a first cooking chamber outlet flue connected at a first end to said cooking chamber and at a second end to said plenum chamber and a second cooking chamber outlet flue connected at a first end to said cooking chamber and at a second end to said plenum chamber for receiving smoke from said cooking chamber through said first and second outlet ports and channeling said smoke into said plenum chamber;

an exhaust stack secured to said plenum chamber, said exhaust stack having mounted therein a stack fan for urging smoke from said plenum chamber through said exhaust stack; and thermostatically controlled gas burner means capable of emitting a forced air flame into said firebox.

2. A convection barbecue pit, as recited in claim 1, wherein said firebox damper means comprises a damper connected to a damper rod and wherein said damper rod is connected to a firebox damper servo motor by linkage means capable of rotating said damper rod upon activation of said firebox damper servo motor for regulating the passage of air through said firebox inlet port into said firebox, and wherein said damage rod is secured to said firebox access door by a plurality of brackets.

3. A convection barbecue pit, as recited in claim 1, wherein said bypass damper means comprises a bypass damper connected to a bypass damper rod and wherein said bypass damper rod is connected to a bypass damper servo motor by linkage means capable of rotating said bypass damper rod upon activation of said bypass damper servo motor for directing the passage of smoke from said joinder flue into said cooking chamber or permitting the passage of smoke from said joinder flue into said plenum chamber.

4. A convection barbecue pit, as recited in claim 1, further comprising nuisance smoke removal means for removing smoke from the vicinity of said firebox access door.

5. A convection barbecue pit, as recited in claim 4, wherein said nuisance smoke removal means comprises a conduit located between said firebox and said cooking chamber, a channel flue connected to said conduit and said first cooking chamber outlet flue and a passage slit on said firebox access door for the passage of nuisance smoke in the vicinity of said firebox access door into said conduit.

6. A convection barbecue pit, as recited in claim 1, wherein said gas burner means comprises a gas burner, a flame duct, and flame duct closure means for protecting the elements of said gas burner from the radiant heat within said firebox.

7. A convection barbecue pit, as recited in claim 6, wherein said flame duct closure means comprises a blast gate, a blast gate servo motor, and linkage means between said blast gate and said blast gate servo motor for raising or lowering said blast gate upon activation of said blast gate servo motor.

8. A convection barbecue pit, as recited in claim 6, wherein said flame duct is angled away from said firebox access door.

9. A convection barbecue pit, as recited in claim 1, wherein said cooking chamber further comprises a plurality of meat rack guides for supporting a plurality of removable meat racks.

10. A convection barbecue pit, as recited in claim 1, wherein said cooking chamber further comprises a grease pan and means for draining grease from said grease pan.

11. A convection barbecue pit, as recited in claim 10, wherein said grease draining means comprises a grease pan drain valve connected to said grease pan.

12. A convection barbecue pit, as recited in claim 1, wherein said discharge duct further comprises an adjustable louver for controlling the passage of smoke through said discharge vent.

13. A convection barbecue pit, as recited in claim 1, wherein said joinder flue and said firebox are lined with a cast refractory material.

14. A convection barbecue pit, as recited in claim 1, further comprising one or more temperature sensing probes for said thermostatically controlled firebox damper means and said thermostatically controlled gas burner means and wherein said temperature sensing probes are centrally located within said cooking chamber.

15. A thermostatically controlled convection barbecue pit, comprising:

a firebox comprising a firebox access door, a firebox outlet port, and a firebox inlet port;

thermostatically controlled firebox damper means for regulating the passage of air through said firebox inlet port into said firebox;

a cooking chamber having at least one cooking chamber access door, said cooking chamber having an inlet port and a first and second cooking chamber outlet port on opposite sides of said cooking chamber inlet port, said cooking chamber having a height of 26½ inches, a width of 68 inches and a depth of 32 inches;

a joinder flue connected at a lower end to said firebox and at an intermediate end to said cooking chamber for the passage of smoke from said firebox through said firebox outlet port into said cooking chamber through said cooking chamber inlet port, said joinder flue having a diameter of 9 inches;

a plenum chamber connected to said joinder flue at an upper end of said joinder flue, said plenum chamber having a dual function bypass damper means therein capable of alternately directing the passage of smoke from said firebox into said cooking chamber, or permitting direct exhaust of smoke from said firebox, said plenum chamber having a height of 13 inches and a width of 12 inches;

a baffle secured within said cooking chamber adjacent to said cooking chamber inlet port for urging smoke from said joinder flue upward within said cooking chamber;

a discharge duct mounted to the ceiling of said cooking chamber comprising a suction port, a discharge vent, and a convection fan mounted within said discharge port above said suction port, said discharge duct shaped to urge smoke forward within said discharge duct in a line parallel to the ceiling of said cooking chamber and the downward through said discharge vent in a line parallel to said cooking chamber access door;

a first outlet duct secured within said cooking chamber adjacent to said first cooking chamber outlet port and a second outlet duct secured within said cooking chamber adjacent to said second cooking chamber outlet port for withdrawing smoke from the bottom of said cooking chamber on either side of said baffle;

a first cooking chamber outlet flue connected at a first end to said cooking chamber and at a second end to said plenum chamber and a second cooking chamber outlet flue connected at a first end to said cooking chamber and at a second end to said plenum chamber for receiving smoke from said cooking chamber through said first and second outlet ports and channeling said smoke into said plenum chamber, said first and second cooking chamber outlet flues having a diameter of 8 inches;

an exhaust stack secured to said plenum chamber, said exhaust stack having mounted therein at exhaust fan for urging smoke from said plenum chamber through said exhaust stack;

thermostatically controlled gas burner means capable of emitting a forced air flame into said firebox;

nuisance smoke removal means comprising a conduit located between said firebox and said cooking chamber, a channel flue connected to said conduit and said first cooking chamber outlet flue and a passage slit on said firebox access door for the passage of nuisance smoke in the vicinity of said firebox access door into said conduit; and one or more temperature sensing probes for said thermostatically controlled firebox damper means and said thermostatically controlled gas burner means and wherein said temperature sensing probes are centrally located within said cooking chamber.

16. A convection barbecue pit, comprising:

a firebox comprising a firebox access door, a firebox outlet port, and a firebox inlet port;

a cooking chamber having at least one cooking chamber access door, said cooking chamber having an inlet port and a first and second cooking chamber outlet port;

a joinder flue connected at a lower end to said firebox and at an intermediate end to said cooking chamber for the passage of smoke from said firebox through said firebox outlet port into said cooking chamber through said cooking chamber inlet port;

a plenum chamber connected to said joinder flue at an upper end of said joinder flue, said plenum chamber having dual function bypass damper means therein capable of alternatively directing smoke from said firebox into said cooking chamber or permitting direct exhaust of smoke from said firebox;

means adjacent to said cooking chamber inlet port for urging smoke from said joinder flue upward within said cooking chamber;

a discharge duct mounted to an upper portion of said cooking chamber comprising a suction port, a discharge vent, and means mounted within said discharge duct for urging smoke forward within said discharge duct and then downward through said discharge vent;

a first outlet duct secured within said cooking chamber adjacent to said first cooking chamber outlet port and a second outlet duct secured within said cooking chamber adjacent to said second cooking chamber outlet port for withdrawing smoke from a bottom of said cooking chamber;

a first cooking chamber outlet flue connected at a first end to said cooking chamber and at a second end to said plenum chamber and a second cooking chamber outlet flue connected at a first end to said cooking chamber and at a second end to said plenum chamber for receiving smoke from said cooking chamber through said first and second outlet ports and channeling said smoke into said plenum chamber; and an exhaust stack secured to said plenum chamber, said exhaust stack having means mounted therein for urging smoke from said plenum chamber through said exhaust stack.

* * * * *